United States Patent [19]
Schotten

[11] 4,083,298
[45] Apr. 11, 1978

[54] PLATE FILTER PRESS WITH ADJUSTABLE END PLATE

[75] Inventor: Alfons Schotten, Duren, Germany

[73] Assignee: Eberhard Hoesch & Sohne, Duren, Germany

[21] Appl. No.: 668,508

[22] Filed: Mar. 19, 1976

[30] Foreign Application Priority Data

Mar. 22, 1975 Germany .............................. 2512823

[51] Int. Cl.² .......................... B30B 1/00; B01D 25/00
[52] U.S. Cl. ...................................... 100/214; 210/224
[58] Field of Search ............................... 100/194–199, 100/112, 115, 295, 268, 214; 308/72, 184 R, 184 A, 207 A; 210/224–230

[56] References Cited
U.S. PATENT DOCUMENTS

| 2,415,766 | 2/1947 | Shapiro ................................. 100/295 |
| 3,562,155 | 2/1971 | Rademacher et al. ................. 210/224 |
| 3,623,424 | 11/1971 | Busse et al. ........................... 100/214 |

FOREIGN PATENT DOCUMENTS 250,882  9/1912  Germany .............................. 210/230

*Primary Examiner*—Edward J. McCarthy
*Attorney, Agent, or Firm*—Spencer & Kaye

[57] ABSTRACT

A plate filter press has a plurality of filter plates arranged in a face-to-face series and mounted to be movable towards and away from one another in the longitudinal direction of the filter press. The latter further has a closing device carried by a closing yoke mounted to be movable in the longitudinal direction; a pressure plate disposed at one end of the filter plate series and connected to the closing yoke and mounted to be movable in the longitudinal direction; and an end plate disposed at the other end of the filter plate series. The closing device, when energized, presses the filter plates by the closing yoke and the pressure plate to one another and against the end plate. The end plate is pivotally and linearly displaceably supported to allow its angular displacement with respect to the longitudinal direction and to further allow its shifting in the longitudinal direction.

9 Claims, 4 Drawing Figures

PLATE FILTER PRESS WITH ADJUSTABLE END PLATE

BACKGROUND OF THE INVENTION

The invention relates to a plate filter press which includes a frame provided with guide supports on which the filter plates, a pressure plate and a closing yoke bearing the closing device are mounted to be displaceable in longitudinal direction, the locking device also being in communication with an end plate which the filter plate stack contacts in its closed state.

German Utility Pat. No. 6,750,401 discloses a plate filter press of the above-mentioned type in which the end plate is formed either by part of the frame with the cylinder of the hydraulic closing device being fastened to a displaceably mounted locking yoke which is connected with the pressure plate via tie rods, or in another embodiment, the end plate as well as the pressure plate are displaceably mounted on the guide supports with the cylinder of the closing device being fastened to the end plate while the piston is supported on the press frame. This type of structure has the drawback that the pressure plate as well as the closing yoke or the end plate, respectively, are positively guided parallel to one another. Since, however, accurate parallel alignment of the filter plates in the closed state cannot be assured during operation due to soiling, particularly of the lower edge of the filter plates, but also due to manufacturing inaccuracies in the filter plates themselves, the filter plate stack, in the closed state, will not contact the end plate in a parallel manner regardless of whether the latter is rigidly connected with the frame, as in the first embodiment, or is displaceably guided at the guide supports. Due to the great closing forces involved, this inevitably results in a deformation of the press frame or at least of the plates connected together by the tie rods somewhat to the shape of a parallelogram. If this deformation is to be avoided, the frame and the plates connected by the tie rods must be made substantially rigid and will thus be very heavy. However when there is no deformation, the plates will no longer fully contact one another so that the individual filter plates are not sufficiently sealed against one another. Since a completely rigid frame cannot be produced with justifiable expenditures, this known plate filter press has the further drawback that the cylinder of the closing device is rigidly connected with the locking yoke or the end plate, respectively. Thus, during movement of the end plate or of the closing yoke, respectively, the sliding surface of cylinder and piston are stressed by canting forces so that not only the slide surfaces but also the seals are subject to great wear.

German Utility Pat. No. 6,803,483 discloses a further embodiment of such a plate filter press in which the connection of the pressure piston with the closing yoke as well as the points of connection of the tie rods with the displaceable pressure plate are effected via spherical bearings. With this arrangement the closing yoke as well as the pressure plate are able to change their vertical position or their rectangular position with respect to the suspending carrier so that they can adapt themselves to the position of the plate stack. Since, however, the plate stack is pressed by the pressure plate against a correspondingly rigid contact surface on the press frame, unavoidable transverse forces will develop when such a plate stack, which in itself is not parallel, is pressed against the end plate formed by the press stand, since all of the filter plates must be shifted against one another toward the pressure plate which is itself articulated at the tie rods. These shifting forces are proportional to the friction forces between the filter plates. These friction forces may become very high depending on the degree of soiling, the properties of the product and of the filter cloth and the material of the plates. Since the pressure cylinder is fastened to the end plate formed by the press stand on the side facing away from the plate stack and centered with respect to the plate stack, the reaction force of the pressure cylinder will also act on the center of the press stand. Since the plates are held in the press stand by guide elements which are each disposed above the center of the plates and since friction forces directed opposite to the reaction force consequently attack at this point, the plate stack will contact one side of the stand at the bottom. The filter plate stack thus automatically takes on the shape of a parallelogram during each closing process. Moreover, in the closed state this might cause a bending moment to act on the press stand which is transferred to the region where the stand portion, which constitutes the end plate, is fastened to the base. This, however, can be compensated only by increased expenditures during the construction of the press stand.

SUMMARY OF THE INVENTION

It is the object of the invention to provide a plate filter press in which the drawbacks of the known embodiments are avoided.

The above object is accomplished by the present invention for a plate filter press of the above-mentioned type in that the end plate is supported to be pivotal and displaceable in longitudinal direction. This assures that the end plate can also adapt its contact surface to the closed filter plate stack so that deformation forces which would have a deleterious effect on the press as a whole can be avoided. In a particularly advantageous embodiment of the invention it is provided that the part of the closing device which is in communication with the end plate is connected with it via a spherical thrust bearing. This assures free adjustability of the end plate.

In a particularly advantageous embodiment, the invention here provides that the center of rotation of the spherical thrust bearing is disposed in the area of the center of gravity of the end plate.

In a further embodiment of the invention it is provided that the spherical thrust bearing is firmly connected with the closing device and contacts the end plate with its one half (head) and the frame with its other half (seat) and that at least one bearing part is supported to be displaceable transversely to the direction of pressure. In addition to this being a particularly favorable structural solution, it has the advantage that possibly occurring transverse forces will not cause the parts of the closing device which move relative to one another to be tilted but that such transverse forces which occur during the closing process are compensated by a corresponding lateral shift of the end plate as well.

In a particularly advantageous embodiment of the plate filter press according to the invention with hydraulic closing device where the cylinder of the closing device is supported by the closing yoke and the free piston end is connected with the end plate, it is provided that part of the free piston end passes through a traverse of the frame and that part of the thrust bearing, preferably the seat, is loosely supported on the traverse. This has the advantage that during closing of the press the hydraulic piston is supported by the traverse so that the spherical thrust bearing is initially under less stress and the end plate can freely move within the thrust bearing, and further, it can freely execute the occasionally necessary slight transverse shifts with respect to the piston.

According to a further embodiment of the invention, it is provided that part of the thrust bearing, preferably the head, is supported in a recess in the end plate and that the spherical thrust bearing is connected with the closing device via a further spherical thrust bearing. This results in accurate centering of the main thrust bearing with respect to the end plate, the shiftable support of the bearing seat on the traverse which is fixed to the frame, permitting the occurrence of transverse shifts. This arrangement of the further spherical thrust bearing whose one bearing part, preferably the bearing seat, is also displaceably supported on the rear of the head prevents possibly occurring transverse shifts of the end plate with respect to the press axis from being introduced into the closing device in the form of transverse forces. According to a further embodiment of the invention, it is advantageous in this connection if parts of the thrust bearing are connected with the closing device under a spring bias. This is of particular advantage if, in addition to the spherical main thrust bearing, an additional thrust bearing is provided for the connection of the main thrust bearing with the closing device.

In a further advantageous embodiment of the invention it is provided that the end plate is displaceably and pivotally held by the frame via separate supporting arms and that the pivot axis passes through the center of rotation of the spherical thrust bearings.

DESCRIPTION OF THE PREFERRED EMBODIMENTS

Figure 1:
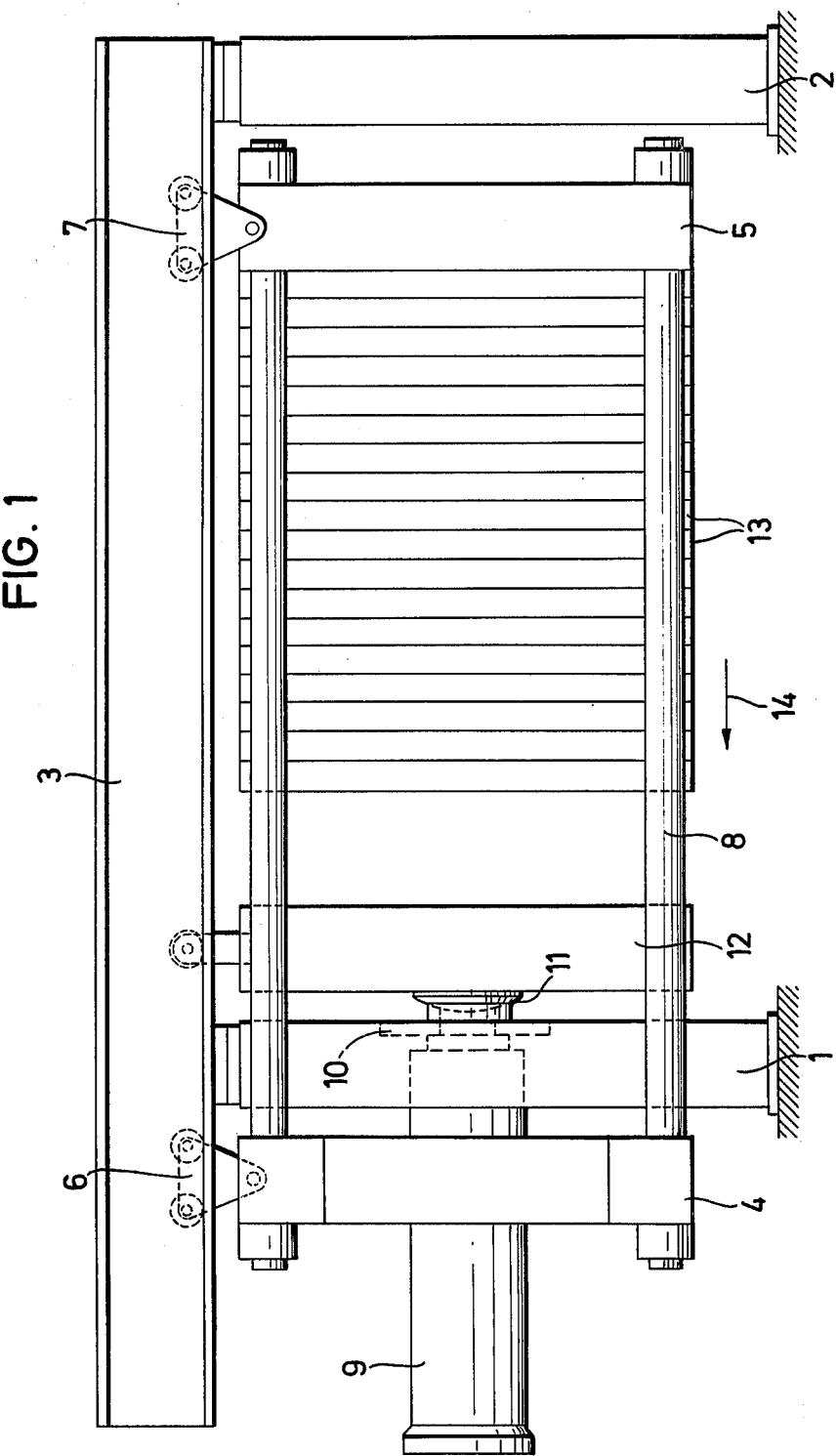
FIG. 1 is a schematic side elevational view of a plate filter press according to a preferred embodiment of the invention.

The embodiment of the plate filter press shown in FIG. 1 is provided with a stationary frame which has two parallel arranged stands 1, 2 each connected together via two parallel juxtaposed guide supports 3 (only one is visible). A closing yoke 4 as well as a pressure plate 5 are displaceably mounted, for example via corresponding roller blocks 6 and 7, at the guide supports. The closing yoke 4 and the pressure plate 5 are connected together by means of tie rods 8.

The filter press closing device 9 is fastened to the closing yoke 4 and comprises a hydraulic cylinder whose piston is supported on a traverse 10 disposed between the pair of stands 1 and connected to an end plate 12 via a spherically designed main thrust bearing 11. The structural configuration of the connection between the closing device 9 and the end plate 12 will be explained in detail with the aid of FIG. 2.

Between the end plate 12 and pressure plate 5, filter plates 13 are disposed which in the open state (as shown) are individually longitudinally displaceable between the end plate and the pressure plate so that the filter cake which accumulates between the individual plates after each filtering process can be removed. If the closing device 9 is actuated to close the press, the unit comprising the locking yoke 4, pressure plate 5 and tie rods 8 shifts the entire filter plate stack formed of filter plates 13 in the direction of arrow 14 toward the end plate 12. The closing device is here supported on the traverse 10 of the frame. As soon as the filter plate stack contacts end plate 12 the force between the closing device and the end plate is transmitted directly so that the press frame is relieved of load.

To open the filter press, the process takes place in the other direction and appropriate filter transporting devices, which are not shown in detail, move the filter plates individually away from the end plate into the open position.

Figure 2:
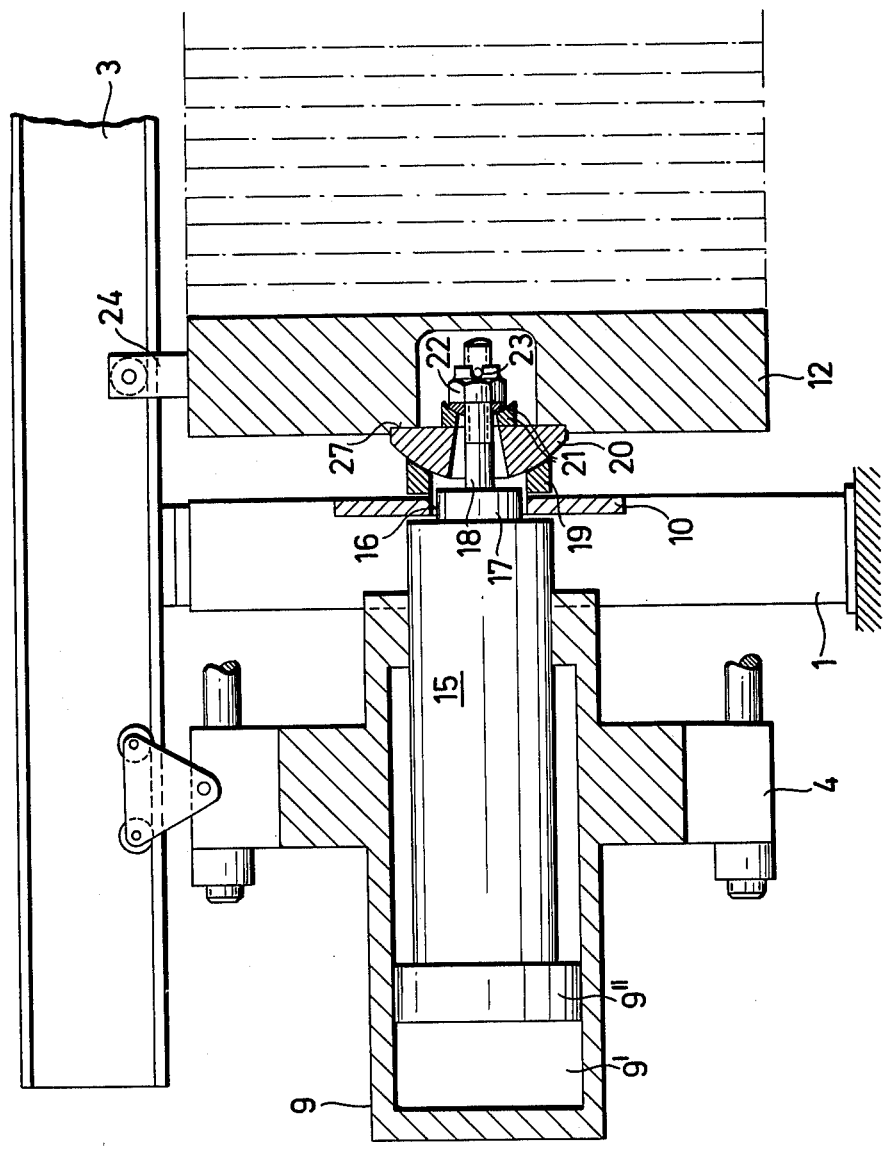
FIG. 2 shows, in an enlarged side elevational view, partially in section, the preferred embodiment of the filter press in the area of the closing device.

FIG. 2 shows in an enlarged view the connection between the closing device 9 and the end plate 12, partially in section. The closing device is here designed as a hydraulic unit with the hydraulic cylinder 9' being fastened to the locking yoke 4 while the piston 9" is supported, via its piston rod 15, on the traverse 10 disposed between the pair of stands 1 (only one shown). The traverse here has an opening 16 through which passes an extension 17 of piston rod 15. A threaded bolt 18 is fastened to this extension over which are pushed the spherical main thrust bearing, including a bearing seat 19 and a head 20. Both parts of the main thrust bearing are pressed against the traverse 10 by means of a clamping nut 22 through the intermediary of a further small spherical thrust bearing 21. The arrangement is here such that seat 19 of the main thrust bearing is displaceable by a certain degree on the traverse 10 in a direction transversely to the axial direction of the filter press while head 20 is held in a corresponding recess 27 of end plate 12. The through bore of head 20 has larger dimensions in its plane of contact at end plate 12 than the diameter of the threaded bolt 18 so that end plate 12 can move with respect to the axis of threaded bolt 18 in a direction transverse thereto, since the bearing seat of the small thrust bearing 21 is displaceably mounted in the plane of the contact surface of head 20. The center of rotation of the main thrust bearing as well as of the small thrust bearing lie in the center of gravity 23 of end plate 12. The suspension 24 of the end plate 12 at the guide support 3 is designed so that it lies exactly vertically above the center of rotation 23 of the thrust bearing.

The adjustment of the spherical main thrust bearing is effected so that during closing of the press the hydraulic piston is supported against traverse 10 and takes the load off the spherical bearing so that end plate 12 is guided by this bearing to be freely movable. If now during the course of the closing process the plate stack finally comes to rest against end plate 12 and if the contact surface of the plate stack is not parallel to the contact surface of the end plate, the end plate can adapt itself, with respect to its suspension and its pressure absorption in the spherical bearing, to the position of the plate stack. The force is here transmitted through head 20 and bearing seat 19 via the traverse to the contact surface of piston 15 at the traverse. The change in height of the center of rotation of the spherical zone resulting from a change in position of end plate 12 away from the vertical is compensated by a shift in seat 19 on the traverse.

While in the illustrated embodiment the spherical thrust bearing 19, 20 and the small spherical thrust bearing 21 are held with the aid of a lockable nut 22 on the threaded bolt of piston 15 with a certain given play, another embodiment provides intermediary spring elements, for example, disc springs which give the entire thrust bearing arrangement a certain bias. The spring arrangement can here be designed so that, if necessary, the small spherical thrust bearing 21 can be eliminated completely since the required freedom of movement between the main thrust bearing and the small spherical bearing can also be effected by appropriately arranged spring elements, particularly stacks of disc springs.

Figure 3:
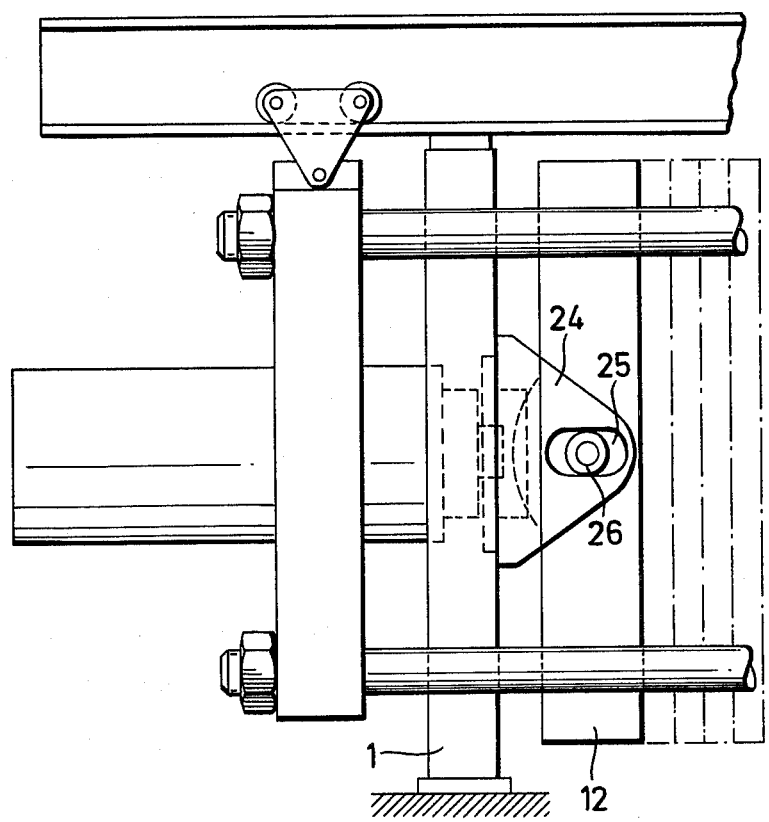
FIG. 3 shows, in side elevation, a modified suspension of the end plate from the frame.

FIG. 3 shows schematically another embodiment for the suspension of the end plate 12. Here the pair of stands 1 (only one shown) is provided with a supporting arm 24 at each side, each of which is provided with a longitudinal hole 25 to accommodate holding pins 26 which are connected to end plate 12. The axis of rotation of pins 26 passes through the center of gravity of end plate 12 and thus also through the center of rotation of the spherical thrust bearing which is designed in the same way as in the sectional view of FIG. 2. In this arrangement the end plate 12 can also pivot freely to assure that it can adapt itself to the required extent to the orientation of the contact surface of the filter plate stack.

Figure 4:
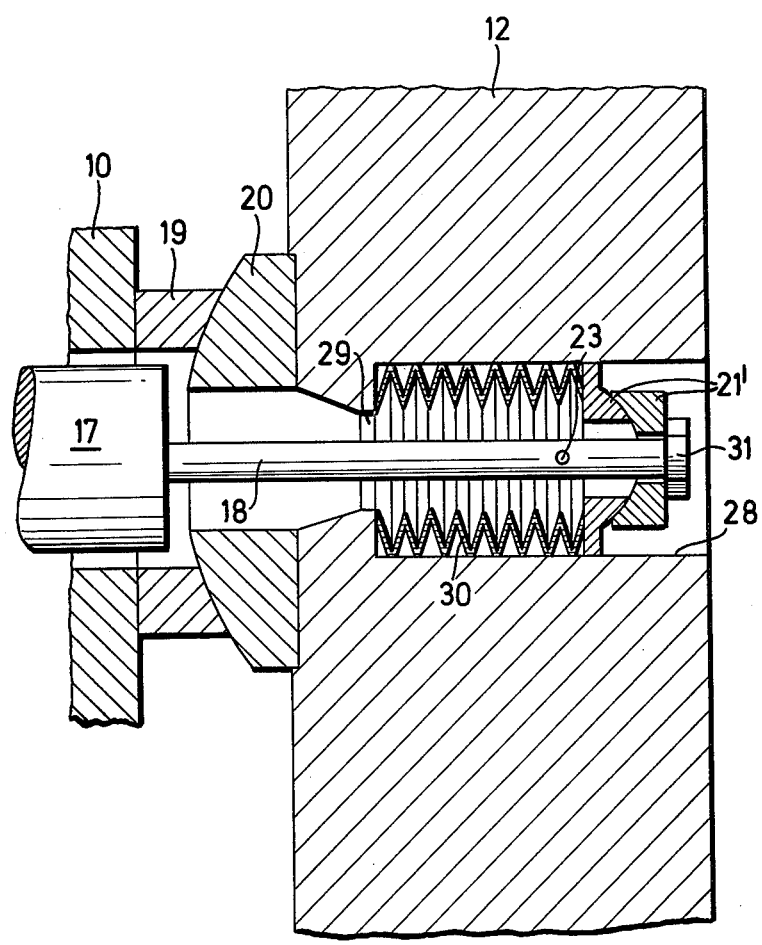
FIG. 4 shows, in sectional side elevation, another embodiment for fastening the bearing head.

FIG. 4 shows an embodiment for the application of spring bias to the thrust bearing. To facilitate the understanding of the structure, the parts identical to those in the FIG. 2 arrangement are provided with the same reference numerals. Here the end plate 12 is provided with a recess 28 whose bottom is provided with a bore 29 through which bolt 18 passes. A spring element 30, for example a disc spring stack, the free end of which is engaged by the small spherical thrust bearing 21', is inserted into recess 28. The bias is set by threaded nut 31 which simultaneously serves as fastener for the entire arrangement. In this embodiment both thrust bearings likewise have the same center of rotation 23.

What is claimed is:

1. In a plate filter press having a machine frame; a plurality of filter plates arranged in a face-to-face series and mounted to be movable towards and away from one another in the longitudinal direction of the filter press; a closing device carried by a closing yoke mounted on the machine frame to be movable in the longitudinal direction; a pressure plate disposed at one end of the filter plate series and being connected to the closing yoke and mounted on the machine frame to be movable in the longitudinal direction; an end plate disposed at the other end of the filter plate series; coupling means connecting the end plate to a component of the closing device; the closing device, when energized, pressing the filter plates by the closing yoke and the pressure plate to one another and against the end plate; the improvement comprising (a) means for pivotally and linearly displaceably supporting said end plate to allow an angular displacement of said end plate with respect to said longitudinal direction and to allow a shift of said end plate in said longitudinal direction;
(b) a traverse rigidly connected with the machine frame; and
(c) a spherical thrust bearing constituting said coupling means and having a seat member and a head member received in said seat member; one of said members engaging said end plate and the other of said members engaging said traverse; said closing device, when energized, pressing said end plate against said traverse with the intermediary of said closing yoke, said pressure plate and said filter plate series.

2. A plate filter press as defined in claim 1, further comprising
(d) means for supporting at least one of said members of said spherical thrust bearing to be displaceable transversely to the direction of pressure exerted on said filter plates by said closing device;
(e) means defining a recess in said end plate; one of said members of said spherical thrust bearing being received in said recess of said end plate; and
(f) an additional thrust bearing connecting said spherical thrust bearing with said component of said closing device; said additional thrust bearing being smaller than said spherical thrust bearing.

3. A plate filter press as defined in claim 1, wherein said means for pivotally and linearly displaceably supporting said end plate comprises a supporting arm attached to said end plate; said supporting arm being displaceably and pivotally mounted on the machine frame to provide for a shifting movement of said end plate and a pivotal movement of said end plate about a pivot axis; said pivot axis passing through the center of rotation of said spherical thrust bearing.

4. A plate filter press as defined in claim 1, wherein said end plate has a center of gravity; the center of rotation of said spherical thrust bearing being situated in the zone of said center of gravity.

5. A plate filter press as defined in claim 1, wherein said spherical thrust bearing is firmly attached to said component of said closing device and has a seat member engaging said traverse; a head member received in said seat member and engaging said end plate; and means for supporting at least one part of said spherical thrust bearing to be displaceable transversely to the direction of pressure exerted on said filter plates by said closing device.

6. A plate filter press as defined in claim 1, wherein said closing device comprises a hydraulic power cylinder attached to said closing yoke, a piston slidably received in said cylinder and having a piston rod constituting said component; said piston rod being coupled to said end plate by said spherical thrust bearing; said piston rod passing through said traverse said other of said members being displaceable transversely to the direction of pressure exerted on said filter plates by said closing device.

7. A plate filter press as defined in claim 1, wherein said head member of said spherical thrust bearing is in engagement with said end plate and said seat member of said spherical thrust bearing is in engagement with said traverse.

8. A plate filter press as defined in claim 2, wherein the member of said spherical thrust bearing received in said recess is said head member.

9. A plate filter press as defined in claim 2, further comprising spring means for connecting said spherical thrust bearing and said additional thrust bearing under spring bias with said closing device.

* * * * *